(12) United States Patent
Rogala

(10) Patent No.: US 11,256,811 B2
(45) Date of Patent: Feb. 22, 2022

(54) SECURE BOOT AT SHUTDOWN

(71) Applicant: Harman International Industries, Incorporated, Stamford, CT (US)

(72) Inventor: David Ray Rogala, Novi, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/897,918

(22) Filed: Jun. 10, 2020

(65) Prior Publication Data
US 2021/0390185 A1 Dec. 16, 2021

(51) Int. Cl.
| | |
|---|---|
| *G06F 21/44* | (2013.01) |
| *G06F 21/71* | (2013.01) |
| *G06F 11/14* | (2006.01) |
| *G06F 21/57* | (2013.01) |
| *G06F 9/4401* | (2018.01) |

(52) U.S. Cl.
CPC .......... *G06F 21/575* (2013.01); *G06F 9/4418* (2013.01); *G06F 11/1417* (2013.01); *G06F 21/44* (2013.01); *G06F 21/71* (2013.01)

(58) Field of Classification Search
CPC ...... G06F 21/575; G06F 9/4418; G06F 21/44; G06F 11/141; G06F 721/71
USPC ................................................. 713/1, 2, 100
See application file for complete search history.

(56) References Cited

U.S. PATENT DOCUMENTS

| | | |
|---|---|---|
| 2016/0282927 A1 | 9/2016 | Adams |
| 2018/0253556 A1 | 9/2018 | Karaginides |
| 2019/0065752 A1 | 2/2019 | Li |
| 2020/0327232 A1* | 10/2020 | Sella .................... G06F 21/572 |

* cited by examiner

*Primary Examiner* — Michael J Brown
(74) *Attorney, Agent, or Firm* — Angela M. Brunetti

(57) ABSTRACT

A secure boot system and method to reduce a total time to boot by performing secure boot validation at shutdown and storing an authentication code in a secure manner, in effect, pre-authenticating an application so that, at the next boot, authentication may be bypassed.

13 Claims, 2 Drawing Sheets

SECURE BOOT AT SHUTDOWN

TECHNICAL FIELD

The present disclosure is directed to a method for secure boot and more particularly to a method for secure boot at shutdown.

BACKGROUND

A secure boot feature in an embedded device is performed to verify the integrity and authenticity of a firmware package while booting. If the firmware has been tampered with or contains errors, a controller can apply corrective actions. If the firmware is not authentic, the controller will generally halt booting invalid software and may go into an emergency restoration mode. For automotive applications, secure boot allows an Electronic Control Unit (ECU) to recognize unauthorized or faulty firmware and prevents such software from jeopardizing safety and personal information of a vehicle user.

Advances in automotive-grade microcontrollers provide hardware-based secure key storage and acceleration for certain cryptographic primitives. Secure key storage is a component, or feature, of a hardware security module (HSM) which also provides an interface to perform crypto operations so that access to a raw key is not required. A SHE module is an example of an HSM module. SHE specification provides 128-bit AES encryption and CMAC capabilities, but it does not provide a dedicated security coprocessor. In some hardware, it is required to use the general purpose processor to command the SHE module and make decisions based on the results of operations. Without a dedicated coprocessor, sequential secure boot processing is required. A write protected bootloader will serve as the trust anchor and has the primary responsibility of validating the next image in the boot chain.

A problem with standard sequential secure boot is that it delays the boot process by a fixed amount of time. This delay is based on the size of the image to be validated and validation processing speed. These attributes are often fixed and are based on the underlying hardware. In a real-time system, such as an automotive ECU, the system must boot and establish communication with vehicle networks quickly. A significant delay can cause a loss of important messages from the vehicle, causing operations failures and diagnostic trouble Codes (DTCs) to be set. In addition, important safety and regulatory functionality may be delayed. For example, activating a display associated with a reverse camera.

The amount of startup delay that can be tolerated depends on the design of the vehicle network and architecture. However, most Original Equipment Manufacturers (OEMs) require that an ECU begin receiving and responding to network messages within 100 ms from the network wakeup event. Consider a microcontroller with 2 MB of flash and a SHE module capable of performing AES-CMAC-128 at a rate of 8 MB/s. The amount of delay required to perform secure boot on this hypothetical part is approximately 250 ms. In addition to secure boot delay, additional delays for initializing clock domains, peripherals and the operating system must be considered. Assuming such delays combine to approximately 50 ms, the combined boot delay is 300 ms. Given the requirement to begin communicating on the vehicle busses within 100 ms, it is apparent that standard sequential secure boot is not suitable.

There is a need for a secure boot that adversely affect the amount of startup time.

SUMMARY

To reduce startup delay, a system and method have been developed to perform secure boot at shutdown. The system and method reduce a total time to boot by performing secure boot validation at shutdown and storing an authentication code in a secure manner, in effect, pre-authenticating an application so that, at the next boot, authentication may be bypassed. Specifically, according to the inventive subject matter, secure boot processing is performed at shutdown and an authentication code is put in cache memory in a secure manner where the authentication code cannot be easily replicated. Performing secure boot at shutdown caches the authentication code before the code is needed at startup. This improves the startup timing by reducing the amount of time that elapses during boot at wakeup. Upon waking, an authentication code key is unlocked. The authentication code is matched with an expected code verifying the bootloader can bypass authentication and validation of the application to safely boot the application.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

While various aspects of the present disclosure are described with reference to one or more embodiments, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

Any one or more of the devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. Any one or more the devices herein may rely on firmware, which may require updates from time to time to ensure compatibility with operating systems, improvements and additional functionality, security updates or the like. One or more devices may operate using a dedicated operating system, multiple software programs and/or platforms for interfaces such as graphics, audio, wireless networking, enabling applications, integrating hardware of vehicle components, systems, and external devices such as smart phones, tablets, and other systems to name just a few.

Figure 1:
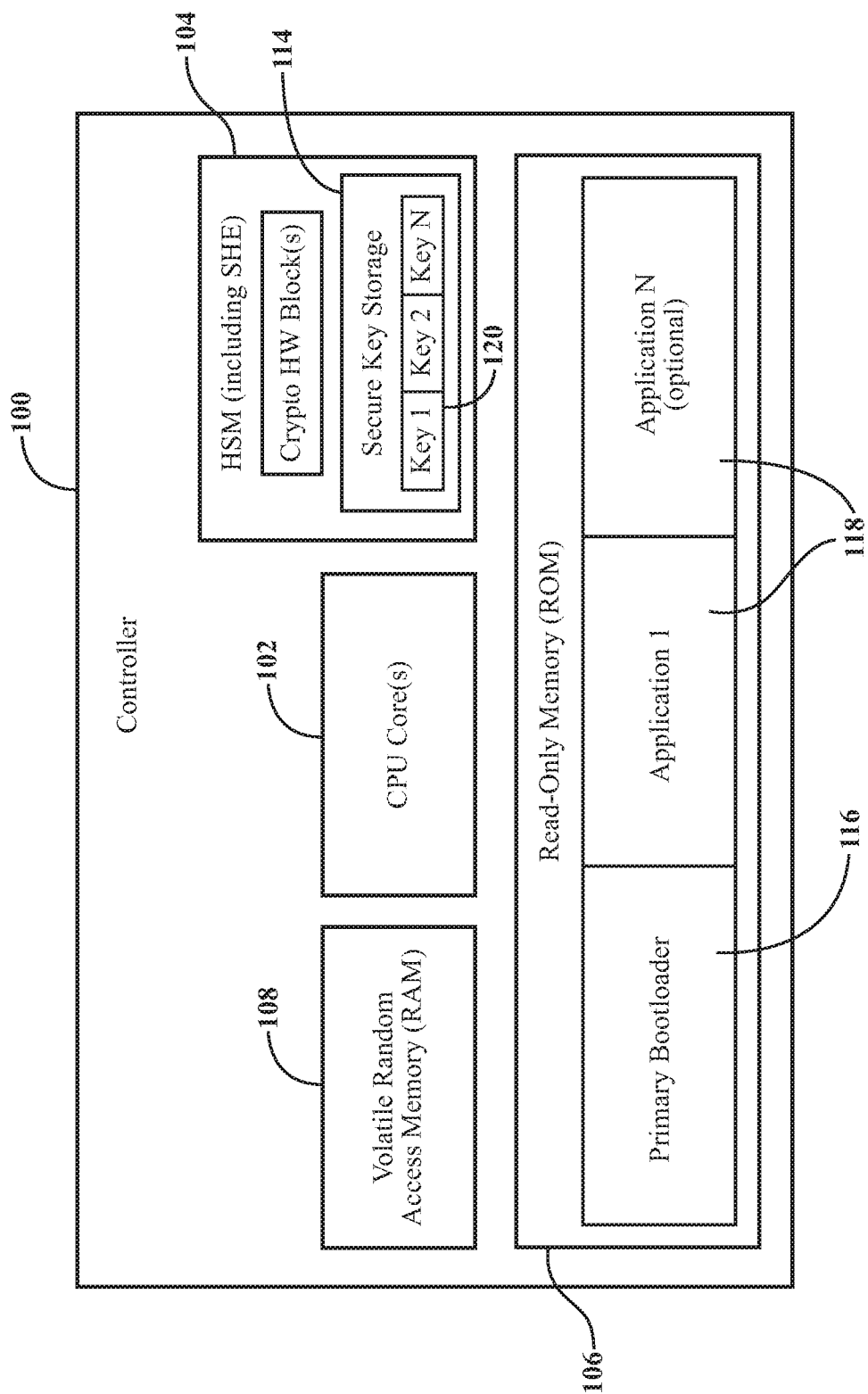
FIG. 1 is a block diagram of an exemplary controller booting application code.

FIG. 1 is a block diagram of an exemplary controller 100 or microcontroller (MCU) for example an automotive microcontroller. Controller 100 has a processor 102 and memory that includes a non-volatile memory device 106 (ROM) and a volatile memory device 108 (RAM). Processor 102 is shown as a central processing unit (CPU). However, variations are possible, such as, but not limited to, an application processor (AP) and a microprocessor. A hardware security module (HSM) 104, which may include SHE, has a secure key storage 114 for one or more keys 120 that protect an authentication code for the MCU 100. A bootloader 116 is write-protected and typically stored in ROM 106. The write protected bootloader 116 will serve as a trust anchor and has the primary responsibility of validating an image in a boot chain for booting one or more applications 118. An application 118 is a program, separate from the bootloader 116, that is intended to execute after the bootloader.

Normally, secure boot is performed at the time of boot in either a sequential or parallel manner to the execution software to be authenticated. The inventive subject matter reduces a total time to boot by performing secure boot validation at shutdown and storing an authentication code in a secure manner, Effectively, the application is pre-authenticated. Therefore, authentication may be bypassed at the next boot. Specifically, according to the inventive subject matter, secure boot processing is performed at shutdown and an authentication code is stored in cache memory in a secure manner where the authentication code cannot be easily replicated. This improves the startup timing by reducing the amount of time that elapses during boot at wakeup. This is particularly advantageous for HSM modules 104 that do not have a dedicated coprocessor, such as a SHE module. Without a dedicated coprocessor, sequential secure boot is required, and standard sequential secure boot delays the boot process in a manner that could adversely affect operations being carried out by the application 118.

During the process of authenticating the application, the authentication code is set by the bootloader 116 and kept hidden from the application 118. To ensure the authentication code cannot be replicated by the application 118, the authentication code is unique to the MCU 100 and is encrypted or derived from a secret key 120, which is only accessible to the bootloader 116. For devices with a SHE module, this is possible by establishing a randomized Advanced Encryption Standard (AES) key 120 that is unique for each device or controller. The AES key 120 is used to generate the authentication code. Using a boot mode setting having first and second settings, the boot mode setting is a known message used as an input which indicates to the bootloader whether or not the application should be booted. In the present example, a first boot mode setting is set by the application and provides an indication to the bootloader that the application needs to be pre-authenticated prior to shutting down the controller. The second boot mode setting is set by the bootloader prior to shutting down the controller and provides an indication to the bootloader that the application is to be booted without having to perform steps to authenticate the application upon the controller waking. In the present example, the first boot mode setting is BOOT_APP_AUTH and the second boot mode setting is BOOT_APP.

Upon the controller waking and initiating boot, the bootloader 116 tests the validity of the authentication code by performing a Cipher-based Message Authentication Code (CMAC) verify operation. This operation compares the authenticated code stored with an expected value. If successful, meaning the authentication code matches the expected value and the known message is set to the second boot mode setting, BOOT_APP, the bootloader 116 clears the authentication code from memory and proceeds to boot the application 118. If the authentication code is not present while booting, meaning the CMAC verification fails, the MCU will perform steps to authenticate the application and shut down or, optionally, enter a recovery mode.

When the authentication code is valid and the boot mode is set to the second setting, prior to passing control to the application 118, the bootloader 116 invalidates the authentication code by clearing the authentication code from memory so that it is not possible for the application 118 to read the authentication code. Also prior to passing control to the application 118, the authentication code key 120 is made inaccessible to the application 118 by locking the key 120. To protect the key, a boot protect flag is set and it is applied to keys 120 in the secure key storage 114 that is part of the HSM 104. Once locked (disabled), the keys 120 with the boot protect flag set cannot be re-enabled until the next boot cycle.

At shut down, the application 118 sets the boot mode setting to the first setting, BOOT_APP_AUTH, before the controller enters the low power state. The second boot mode setting BOOT_APP_AUTH provides an indication to the bootloader 116 to validate and store the authentication code before shutting down and entering a low power state.

No unintended code may be executed in between secure boot validation at shutdown and a wake event. To ensure the contents of flash memory have not been modified by external means while the system is in low power state, all external connections for programming and debugging are protected with a password or disabled. Lastly, exiting deep-sleep mode is internally treated as a reset and any following boots are executed from the reset vector. The reset vector is fixed and cannot be modified.

Figure 2:
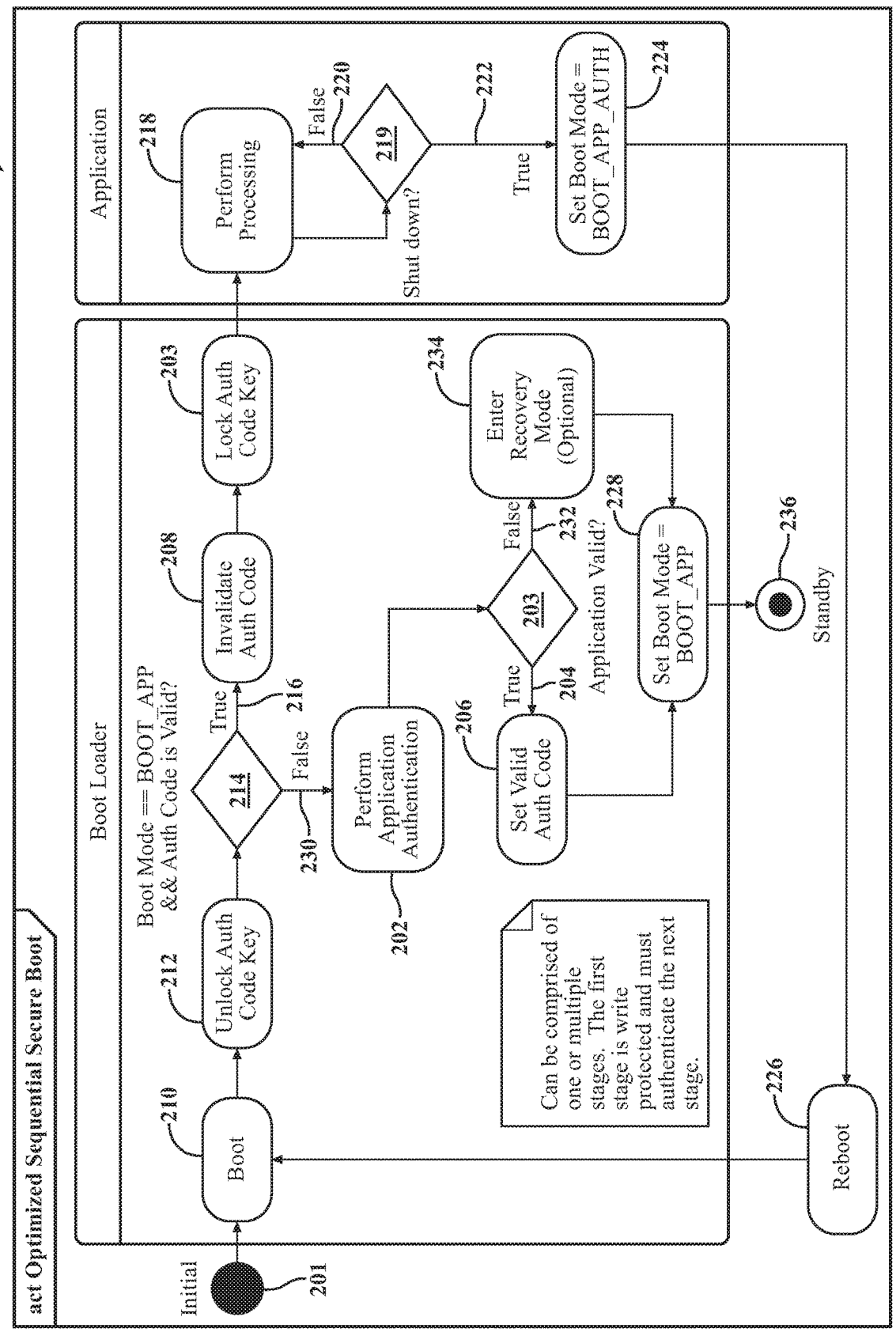
FIG. 2 is a flow diagram of a secure boot method for the controller of FIG. 1.

FIG. 2 is a flow diagram of a method 200 for secure boot at shutdown. Beginning with an initial boot 201, which occurs when the controller is initially connected to a battery, the bootloader boots 210 by unlocking 212 the authentication code key. During the initial boot, a status of the boot mode setting and a check of the validity of the authentication code is performed 214. Because there has been no pre-authentication of the application, the authentication code is expected to be invalid 230. Authentication 202 of the application will be performed. After the application is authenticated 202, a validity check 203 of the application is performed. If the application has been authenticated and it is valid 204, an authentication code is set 206. The authentication code is protected by a key and is stored in persistent memory. The boot mode is set to the second setting, BOOT_APP, indicating to the bootloader that it should boot the application at the next boot.

During the initial boot, the bootloader is rebooted 226 and at boot 210 the authentication code key is unlocked 212. The authentication and validity are checked 214. The boot mode was set to the second setting, BOOT_APP, indicating to the bootloader that the application should be booted. At the same time, the validity of authentication code is checked

214. This is accomplished by comparing the authentication code to an expected value and, if they match, the authentication code is valid. Upon both conditions, the boot mode is set to the second setting and the authentication code is valid, the bootloader prepares to pass control to the application. Prior to passing control to the application for processing, the authentication code is invalidated 208 and the authentication code key is locked 203. This protects the application from accessing the authentication code and authentication code key without first being authenticated.

Until shut down 219 is initiated 222, the application continues 220 to perform processing 218. At shut down 222, the application sets 224 the boot mode to the first boot mode setting, BOOT_AUTH_APP, to indicate to the bootloader that the application is to be pre-authenticated before the MCU enters a low power sleep state.

Prior to entering the low power state, the application reboots 226 and the bootloader unlocks 212 the authentication code key. This time, when the method 200 determines 214 whether the boot mode is set to BOOT_APP and the authentication code is valid 214, the answers will both be false 230 because prior to passing control to the application the authentication code was invalidated and prior to the reboot 226, the application set 224 the boot mode setting was set to the first setting, BOOT_AUTH_APP.

The bootloader goes through the steps to authenticate 202 the application, set a valid authentication code 206, and set the boot mode to the second boot mode setting, BOOT_APP, as an indicator that the application has been pre-authenticated prior to shut down and is ready to be booted at the next boot. Finally, the MCU enters the low power sleep state 236 with the application being pre-authenticated and ready to boot.

At the next boot 210, the bootloader unlocks 212 the authentication code key, determines 214 the boot mode is set to the second setting and the authentication code is valid 216, so the bootloader invalidates 208 the authentication code and locks 203 the authentication code key before passing control to the application. This time, boot occurs without going through the steps of authentication and validation thereby reducing boot time. Because the authentication code has been invalidated 208 prior to control being passed to the application, it is impossible for the application to read the authentication code again without first going through the secure boot at shutdown.

For instances when the authentication code is invalid or is not present 232, the bootloader falls back to performing full authentication and validation 202, 204, 206, 228 of the installed firmware, or an optional recovery mode 234 may be entered.

The boot mode settings (BOOT_APP or BOOT_APP_AUTH) are stored in persistent memory. The boot mode controls the boot flow operational mode depending on its value. When the bootloader sets 228 the boot mode to the second boot mode setting, BOOT_APP, authentication 202 has already have been performed and therefore it is not carried out upon waking saving valuable boot time. The application has the responsibility to set the boot mode setting to the second boot mode setting, BOOT_APP_AUTH, 224 when shutting down. The second boot mode setting for boot mode notifies the bootloader that authentication 202 and validation 203, 204 need to take place before the MCU enters a low power, or standby, state 236.

In the foregoing specification, the present disclosure has been described with reference to specific exemplary embodiments. Various modifications and changes may be made, however, without departing from the scope of the present disclosure as set forth in the claims. For example, the method may be comprised on one or multiple stages. The first state is write-protected and must authenticate the next stage. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present disclosure, in addition to those not specifically recited, may be varied or otherwise particularly adapted to specific environments, manufacturing specifications, design parameters or other operating requirements without departing from the general principles of the same.

What is claimed is:

1. A secure boot method comprising the steps of:
    shutting down an application being processed by a controller;
    setting, by the application at shut down, a boot mode to a first setting to indicate to a bootloader that, upon a next boot, the bootloader should authenticate the application;
    the controller rebooting the bootloader prior to the controller entering its low power state;
    authenticating the application;
    setting an authentication code;
    storing the authentication code in persistent memory;
    setting, at the bootloader, the boot mode to a second setting to indicate to the bootloader that, upon the next boot, the bootloader should boot the application; and
    entering the low power state.

2. The method of claim 1, further comprising the steps of:
    upon waking from the low power state, determining the boot mode variable is set to boot the application;
    unlocking an authentication code key at the bootloader;
    accessing the authentication code using the authentication code key;
    comparing the authentication code to an expected value;
    when the authentication code matches the expected value and the boot mode is at the second setting, invalidating the authentication code associated with the application and locking the authentication code key; and
    passing control from the bootloader to the application.

3. The method of claim 2, further comprising the steps of:
when the authentication code does not match the expected value or the boot mode is at the first setting, repeating the steps of:
authenticating the application;
setting an authentication code;
storing the authentication code in persistent memory;
setting the boot mode variable at the bootloader to indicate to the bootloader that, upon the next boot, the bootloader should boot the application; and
entering the low power state.

4. The method of claim 2, further comprising the step of entering a recovery mode when the authentication code does not match the expected value or the boot mode is at the second setting.

5. A secure boot system comprising:
a controller;
a read-only memory device storing a bootloader and at least one application to be authenticated using an authentication code encrypted using a randomized authentication code key that is unique to a device;
a hardware security module storing the randomized authentication key at a bootloader;
a boot mode having a first setting, set by the at least one application at shut down, that indicates to the bootloader that the application is to be authenticated at shut down and a second setting, set by the bootloader before the controller enters its low power state, that indicates to the bootloader that the application is to be booted; and
at shutdown, prior to the controller entering its low power state, the controller is configured to execute instructions in the bootloader to reboot the at least one application, authenticate the at least one application, set a valid authentication code, and set the boot mode to the second setting.

6. The system of claim 5, wherein upon waking from the low power state, the controller is configured to execute instructions in the bootloader to unlock the randomized authentication code key, use the randomized authentication code key to confirm the authentication code is valid, and, prior to passing control to the at least one application, invalidate the authentication code, and lock the randomized authentication code key.

7. The system of claim 5, wherein upon waking from the low power state, the controller is further configured to execute instructions in the bootloader to unlock the randomized authentication code key, use the randomized authentication code key to confirm the authentication code is invalid, and, prior to passing control to the at least one application, the controller executes instructions in the boot loader to authenticate the at least one application, set a valid authentication code, and set the boot mode to the second setting, reboot, unlock the randomized authentication code key, use the randomized authentication code key to confirm the authentication code is valid, and, prior to passing control to the at least one application, invalidate the authentication code, and lock the randomized authentication code key.

8. The system of claim 5, wherein upon waking from the low power state, the controller is further configured to execute instructions in the bootloader to unlock the randomized authentication code key, use the randomized authentication code key to confirm the authentication code is invalid, attempt to authenticate the application, and upon a failure to authenticate the application, enter a recovery mode.

9. A secure boot method comprising the steps of:
setting, at an application, a boot mode to a first setting, the first setting indicates to a bootloader that the application is to be authenticated prior to the controller entering a low power state;
the controller rebooting the bootloader prior to the controller entering its lower power state;
authenticating the application;
setting an authentication code;
setting, at the bootloader, the boot mode to a second setting, the second setting indicates to the bootloader that upon waking, the application should be booted; and
entering a low power state.

10. The method of claim 9, further comprising the steps of:
encrypting the authentication code with an authentication code key that is randomized and is unique to a device;
upon waking, unlocking the authentication code key;
verifying the authentication code is valid using the authentication code key;
invalidating the authentication code;
locking the authentication code key; and
passing control from the bootloader to the application after invalidating the authentication code and locking the authentication code key.

11. The method of claim 10 wherein the step of invalidating the authentication code further comprises preventing the application from accessing the authentication code by clearing the authentication code from memory prior to passing control from the bootloader to the application.

12. The method of claim 9, further comprising the steps of:
encrypting the authentication code with an authentication code key that is randomized and is unique to a device;
upon waking, unlocking the authentication code key;
verifying the authentication code is invalid using the authentication code key;
authenticating the application;
setting an authentication code; and
setting, at the bootloader, the boot mode to a second setting, the second setting indicates to the bootloader that upon waking, the application should be booted.

13. The method of claim 9, further comprising the steps of:
encrypting the authentication code with an authentication code key that is randomized and is unique to a device;
upon waking, unlocking the authentication code key;
verifying the authentication code is invalid using the authentication code key;
attempting to authenticate the application;
upon failing to authenticate the application, entering a recovery mode; and
setting, at the bootloader, the boot mode to a second setting, the second setting indicates to the bootloader that upon waking, the application should be booted.

* * * * *